United States Patent
Barrow, III (12)

(10) Patent No.: US 7,108,076 B1
(45) Date of Patent: Sep. 19, 2006

(54) WEED PULLING SYSTEM

(76) Inventor: Frank P. Barrow, III, 13343 Swallowtale Dr., Bradenton, FL (US) 34202

( * ) Notice: Subject to any disclaimer, the term of this patent is extended or adjusted under 35 U.S.C. 154(b) by 0 days.

(21) Appl. No.: 11/018,953

(22) Filed: Dec. 21, 2004

(51) Int. Cl.
*A01B 1/00* (2006.01)

(52) U.S. Cl. .................... 172/378; 294/50.8

(58) Field of Classification Search ............. 172/371, 172/373, 374, 378; 294/50.8, 50.9, 53.5; D8/4, 5
See application file for complete search history.

(56) References Cited

U.S. PATENT DOCUMENTS

| | | | | |
|---|---|---|---|---|
| 1,620,223 A | * | 3/1927 | Parker | 30/349 |
| 2,660,788 A | * | 12/1953 | Cobb | 30/349 |
| D238,650 S | * | 2/1976 | Koblick | D8/5 |
| 3,972,552 A | * | 8/1976 | Earp, Jr. | 294/19.1 |
| 4,315,447 A | * | 2/1982 | Tartaglia et al. | 81/421 |
| 4,396,217 A | * | 8/1983 | Hodgson et al. | 294/131 |
| 4,711,482 A | * | 12/1987 | Brown et al. | 294/19.1 |
| 5,400,452 A | * | 3/1995 | Goldstein | 7/135 |
| 5,727,580 A | * | 3/1998 | Patterson | 134/115 R |
| 5,727,828 A | * | 3/1998 | Jones | 294/50.8 |
| 5,853,211 A | * | 12/1998 | Sawdon et al. | 294/116 |
| 5,931,517 A | * | 8/1999 | Welch | 294/50.8 |
| 6,840,768 B1 | * | 1/2005 | Rabal | 433/159 |

\* cited by examiner

*Primary Examiner*—Victor Batson
(74) *Attorney, Agent, or Firm*—Edward P. Dutkiewicz

(57) ABSTRACT

A weed pulling system has a pair of similarly configured rods in a cylindrical configuration, a pair of similarly configured gripping heads on the ends of the rods movable toward and away from each other; and a pair of similarly configured replaceable pads having an exterior gripping surface and an interior surface removably receivable on an associated head.

2 Claims, 3 Drawing Sheets

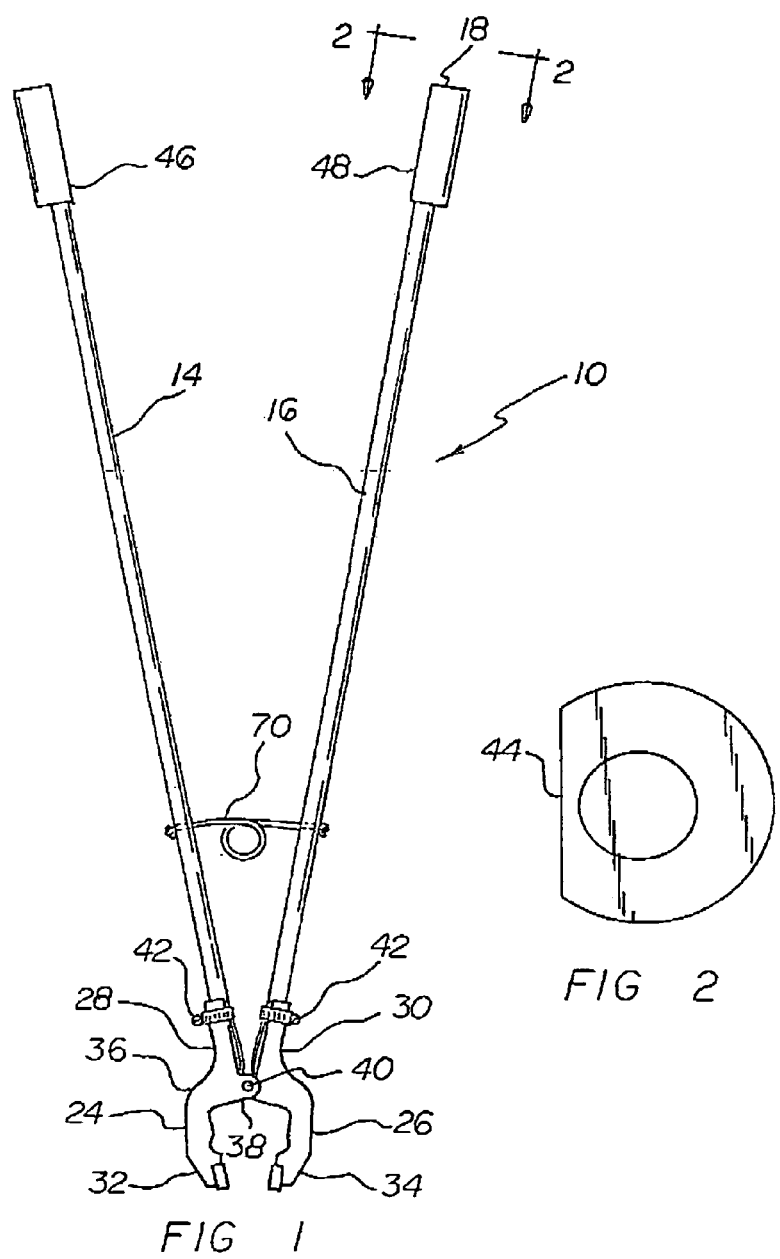

WEED PULLING SYSTEM

BACKGROUND OF THE INVENTION

1. Field of the Invention

The present invention relates to a weed pulling system and more particularly pertains to facilitating the safe, rapid and convenient pulling of weeds and other undesirable vegetation.

2. Description of the Prior Art

The use of weed pulling systems of known designs and configurations is known in the prior art. More specifically, weed pulling systems of known designs and configurations previously devised and utilized for the purpose of pulling weeds are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 6,405,411 issued Jun. 18, 2002 to Rucker relates to a wick trimmer and capture device. U.S. Pat. No. 3,990,146 issued Nov. 9, 1976 to Asselta relates to a plant cupping and lifting device. Lastly, U.S. Pat. No. 3,328,066 issued Jun. 27, 1967 to Johnston relates to a pickup device for trash.

While these devices fulfill their respective, particular objectives and requirements, the aforementioned patents do not describe weed pulling system that allows facilitating the safe, rapid and convenient pulling of weeds and other undesirable vegetation.

In this respect, the weed pulling system according to the present invention substantially departs from the conventional concepts and designs of the prior art, and in doing so provides an apparatus primarily developed for the purpose of facilitating the safe, rapid and convenient pulling of weeds and other undesirable vegetation.

Therefore, it can be appreciated that there exists a continuing need for a new and improved weed pulling system which can be used for facilitating the safe, rapid and convenient pulling of weeds and other undesirable vegetation. In this regard, the present invention substantially fulfills this need.

SUMMARY OF THE INVENTION

In view of the foregoing disadvantages inherent in the known types of weed pulling systems of known designs and configurations now present in the prior art, the present invention provides an improved weed pulling system. As such, the general purpose of the present invention, which will be described subsequently in greater detail, is to provide a new and improved weed pulling system and method which has all of the advantages of the prior art and none of the disadvantages.

To attain this, the present invention essentially comprises a weed pulling system for facilitating the safe, rapid and convenient pulling of weeds and other undesirable vegetation. The system comprises, in combination, a pair of similarly configured rods including a first rod and a laterally disposed second rod, each rod being fabricated of an essentially rigid material, each rod being in a cylindrical configuration with a length of about 40 inches and a diameter of about 0.875 inches, each rod having an upper end and a lower end with a central extent there between.

Next provided is a pair of similarly configured gripping heads fabricated of a generally rigid material including a first head with an upper region removably received on the lower end of the first rod and a second head with an upper region removably received on the lower end of the second rod, each head having a lower region with lateral projections on the lower ends thereof, the lower regions of the heads movable toward and away from each other during operation and use, each head having a central extent with an aperture and a pin extending through the apertures to achieve a pivoting relationship of the rods and the heads, the heads each having an associated connector in the form of a metallic strap to releasably secure each head to its associated rod.

Provided next is a pair of grips fabricated of an elastomeric foam having limited resilience for comfortable holding by a user, the grips having a generally cylindrical configuration with flat regions facing each other, each grip having a length of about 6 inches and an interior diameter of about 0.625 inches to create an interference fit when removably received on the upper ends of the rods, the grips adapted to be moved toward and away from each other to effect the movement of the lower regions of the heads with respect to each other;

A pair of similarly configured replaceable pads fabricated of a resilient material selected from the class of resilient materials including rubber and plastic and blends thereof is next provided, each pad having an exterior gripping surface with an upper edge and a lower edge and an outwardly angled lower surface movable into parallelism when in mutual contact, each pad having an interior surface with lateral recesses extending from the upper end and with the lower extents of the lower regions of the heads having lateral projections removably receivable within the lateral recesses.

A leaf spring in a generally U-shaped configuration is positioned between the lower ends of the rods with a semicircular lower extent beneath the pin for urging the lower ends of the rods and heads away from each other.

Lastly provided is a length of rope with free ends attached to central extents of the rods closer to the lower ends than the upper ends of the rods to limit the separation of the grips and the forces applied to the pads during operation and use.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved weed pulling system which has all of the advantages of the prior art weed pulling systems of known designs and configurations and none of the disadvantages.

It is another object of the present invention to provide a new and improved weed pulling system which may be easily and efficiently manufactured and marketed.

It is further object of the present invention to provide a new and improved weed pulling system which is of durable and reliable constructions.

An even further object of the present invention is to provide a new and improved weed pulling system which is susceptible of a low cost of manufacture with regard to both materials and labor, and which accordingly is then susceptible of low prices of sale to the consuming public, thereby making such weed pulling system economically available to the buying public.

Even still another object of the present invention is to provide a weed pulling system for facilitating the safe, rapid and convenient pulling of weeds and other undesirable vegetation.

Lastly, it is an object of the present invention to provide a new and improved weed pulling system with a pair of similarly configured rods in a cylindrical configuration, a pair of similarly configured gripping heads on the ends of the rods movable toward and away from each other; and a pair of similarly configured replaceable pads with an exterior gripping surface and an interior surface removably receivable on an associated head.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a weed pulling system constructed in accordance with the principles of the present invention.

FIG. 2 is an end view of a grip taken at line 2–2 of FIG. 1.

The same reference numerals refer to the same parts throughout the various Figures.

DESCRIPTION OF THE PREFERRED EMBODIMENT

Figure 3:
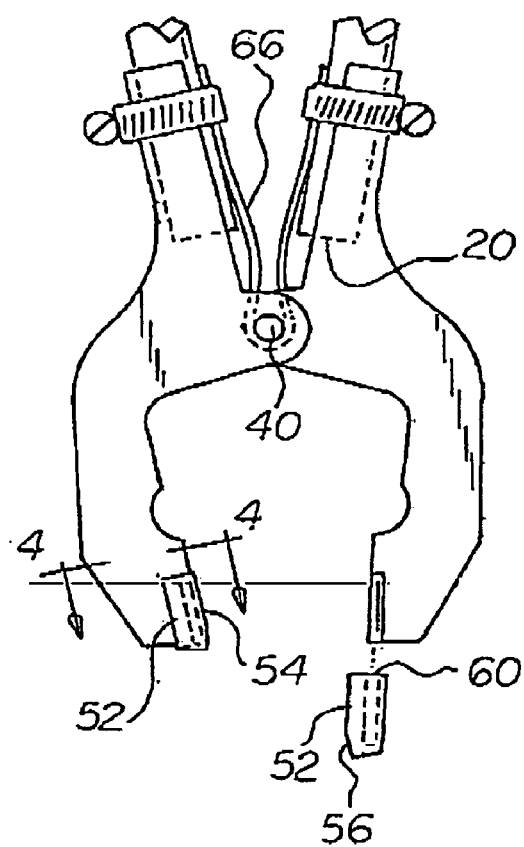
FIG. 3 is an enlarged side elevational view, in partially exploded configuration, illustrating the rods and heads shown in FIG. 1.
Figure 4:
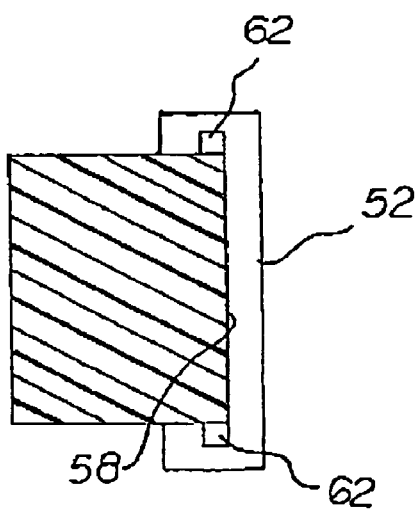
FIG. 4 is a cross sectional view taken along line 4–4 of FIG. 3.
Figure 5:
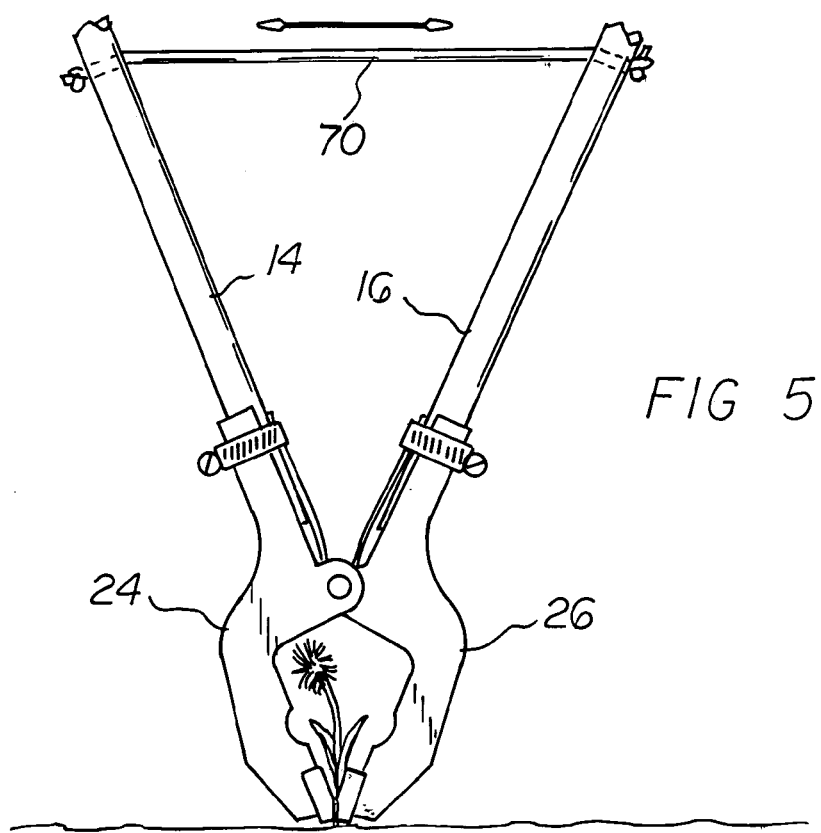
FIG. 5 is a side elevational view of the lower components of FIG. 1 but in the weed gripping orientation.

With reference now to the drawings, and in particular to FIG. 1 thereof, the preferred embodiment of the new and improved weed pulling system embodying the principles and concepts of the present invention and generally designated by the reference numeral 10 will be described.

The present invention, the weed pulling system 10 is comprised of a plurality of components. Such components in their broadest context include a pair of rods, a pair of gripping heads, and a pair of replaceable gripping pads. Such components are individually configured and correlated with respect to each other so as to attain the desired objective.

First provided is a pair of similarly configured rods 14, 16. The rods include a first rod 14 and a laterally disposed second rod 16. Each rod is fabricated of an essentially rigid material, preferably wood. Each rod is in a cylindrical configuration with a length of about 40 inches and a diameter of about 0.875 inches. Each rod has an upper end 18 and a lower end 20 with a central extent between the upper end and the lower end.

Next provided is a pair of similarly configured gripping heads 24, 26 fabricated of a generally rigid material, preferably plastic. The gripping heads include a first head 24 with an upper region 28 removably received on the lower end of the first rod 14. The gripping heads also include a second head 26 with an upper region 30 removably received on the lower end of the second rod 16. Lower regions of each head 32, 34 are movable toward and away from each other during operation and use. Each head has a central extent 36 with an aperture 38. A pin 40 extends through the apertures to achieve a pivoting relationship of the rods and the heads. The heads each have an associated connector 42 in the form of a metallic strap to releasably secure each head to its associated rod. Each head also has a lower region with lateral projections 62 on the lower ends thereof.

Next provided is a pair of grips 46, 48. The grips are fabricated of an elastomeric foam having limited resilience for comfortable holding by a user. The grips having a generally cylindrical configuration with flat regions 44 facing each other. Each grip has a length of about 6 inches and an interior diameter of about 0.625 inches to create an interference fit when removably received on the upper ends of the rods. The grips are adapted to be moved toward and away from each other to effect the movement of the lower ends of the heads into and out of contact with respect to each other.

Next provided is a pair of similarly configured replaceable pads 52. The pads are fabricated of a resilient material selected from the class of resilient materials including rubber and plastic and blends thereof. Each pad has an exterior gripping surface 54 with an upper edge and a lower edge and an outwardly angled lower surface 56 movable into parallelism when in mutual contact. Each pad has an interior surface 58 with lateral recesses 60 extending from the upper end. The lateral projections 62 of the lower extent of the heads are removably receivable within the lateral recesses.

Next provided is a leaf spring 66. The leaf spring is preferably fabricated of stainless steel. The leaf spring is in a generally U-shaped configuration positioned between the lower ends of the rods with a semicircular lower extent beneath the pin for urging the lower ends of the rods and heads away from each other.

Lastly, a length of rope 70 is provided. The length of rope has free ends, each of the free ends is attached to the central extent of one of the rods closer to the lower end than the upper end of the rod. The length of rope limits the separation of the grips and the forces applied to the pads during operation and use.

Figure 6:
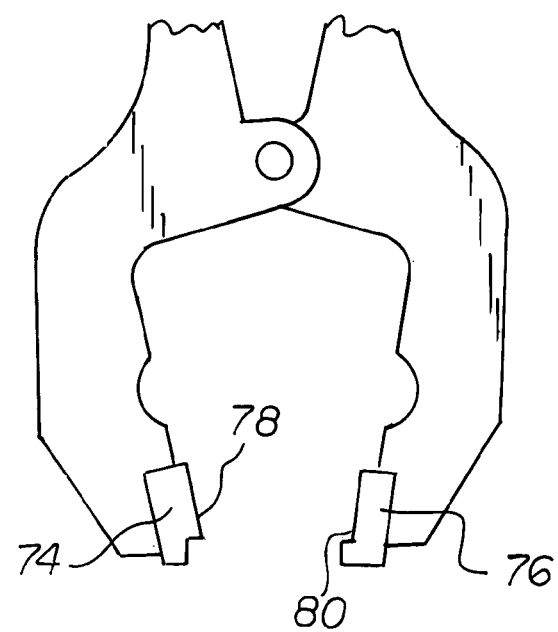
FIG. 6 is a side elevational view similar to FIG. 3 but illustrating an alternate embodiment of the invention.

An alternate embodiment of the invention is shown in FIG. 6. In this embodiment, the exterior surfaces of the pads 74, 76 include complimentary facing surfaces 78, 80 in generally L-shaped configurations with vertical sections and intermediate horizontal sections. This configuration increases the gripping capabilities of the pads during operation and use.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A weed pulling system comprising:
   a pair of rods in a cylindrical configuration, each having an upper end and a lower end;
   a pair of gripping heads, each head removably received on the lower end of each rod, the heads each having an upper region and a lower region, the lower regions movable toward and away from each other;
   a pair of replaceable pads, each pad having an exterior gripping surface and an interior surface removably receivable on an associated head, each head also having a central extent with an aperture; and
   a pivot pin extending through the apertures to achieve a pivoting relationship of the rods and the heads;
   a leaf spring in a generally U-shaped configuration positioned between the lower ends of the rods with a semicircular lower extent beneath the pin for urging the upper ends and lower ends of the rods and the heads as well as the pads away from each other; and
   a length of material attached to central extents of the rods to limit the forces applied to the pads during operation and use.

2. A weed pulling system for facilitating the safe, rapid and convenient pulling of weeds and other undesirable vegetation comprising, in combination:
   a pair of rods including a first rod and a laterally disposed second rod, each rod being fabricated of an essentially rigid material, each rod being in a cylindrical configuration with a length of about 40 inches and a diameter of about 0.875 inches, each rod having an upper end and a lower end with a central extent there between;
   a pair of gripping heads fabricated of a generally rigid material including a first head with an upper region removably received on the lower end of the first rod and a second head with an upper region removably received on the lower end of the second rod, each head having a lower region with lateral projections on the lower ends thereof, the lower regions of the heads movable toward and away from each other during operation and use, each head having a central extent with an aperture and a pin extending through the apertures to achieve a pivoting relationship of the rods and the heads, the heads each having an associated connector in the form of a metallic strap to releasably secure each head to its associated rod;
   a pair of grips fabricated of an elastomeric foam having limited resilience for comfortable holding by a user, the grips having a generally cylindrical configuration with flat regions facing each other, each grip having a length of about 6 inches and an interior diameter of about 0.625 inches to create an interference fit when removably received on the upper ends of the rods, the grips adapted to be moved toward and away from each other to effect the movement of the lower regions of the heads with respect to each other;
   a pair of replaceable pads fabricated of a resilient material selected from the class of resilient materials including rubber and plastic and blends thereof, each pad having an exterior gripping surface with an upper edge and a lower edge and an outwardly angled lower surface movable into parallelism when in mutual contact, each pad having an interior surface with lateral recesses extending from the upper end and with the lower extents of the lower regions of the heads having lateral projections removably receivable within the lateral recesses;
   a leaf spring in a generally U-shaped configuration positioned between the lower ends of the rods with a semicircular lower extent beneath the pin for urging the lower ends of the rods and heads away from each other; and
   a length of rope with free ends attached to central extents of the rods closer to the lower ends than the upper ends of the rods to limit the separation of the grips and the forces applied to the pads during operation and use.

* * * * *